(12) United States Patent
Garrard et al.

(10) Patent No.: US 7,996,849 B2
(45) Date of Patent: Aug. 9, 2011

(54) METHOD, APPARATUS AND SOFTWARE FOR MANAGING A TRANSACTIONAL MESSAGE QUEUE

(75) Inventors: Anthony Alan Garrard, Horton Hgath (GB); David John Locke, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 12/022,170

(22) Filed: Jan. 30, 2008

(65) Prior Publication Data

US 2008/0196039 A1    Aug. 14, 2008

(51) Int. Cl.
*G06F 13/00* (2006.01)
(52) U.S. Cl. ........................................ 719/313; 719/314
(58) Field of Classification Search .................. 719/313, 719/314
See application file for complete search history.

(56) References Cited

U.S. PATENT DOCUMENTS

| | | | |
|---|---|---|---|
| 7,039,671 B2 * | 5/2006 | Cullen | 709/201 |
| 7,757,119 B2 * | 7/2010 | Hickson | 714/16 |
| 2006/0294333 A1 * | 12/2006 | Michaylov et al. | 711/168 |

* cited by examiner

*Primary Examiner* — Andy Ho
(74) *Attorney, Agent, or Firm* — Brian J. Teague (57) ABSTRACT

Provided are a method, apparatus and a computer program for managing message queues. Message streaming is enabled in a transactional messaging system that supports priority ordering of messages, without the need for complex locking mechanisms. Any messages which are transferred from a message queue to a message consumer after the message consumer initiates commit processing are replaced on the message queue at an appropriate position ahead of other messages. As part of commit processing, the consumer sends back to the manager of the message queue an identification of messages delivered to it before the commit, and this list of messages is extracted and compared with a message log to identify undelivered messages. Successfully delivered and committed messages can be committed by the queue manager, and undelivered messages can be replaced on the queue. A special high priority is assigned to the replaced messages to place them ahead of other messages.

25 Claims, 5 Drawing Sheets

METHOD, APPARATUS AND SOFTWARE FOR MANAGING A TRANSACTIONAL MESSAGE QUEUE

BACKGROUND OF THE INVENTION

The present invention relates to a method, apparatus or software for managing a transactional message queue in a computer system.

One way in which application programs on computer systems communicate with each other is via message oriented middleware (MOM). MOM products provide the architecture for managing the flow of messages between communicating programs that may otherwise be difficult to integrate. Some MOMs comprise a message provider, which uses a message queue to manage the passing of messages between message producers and message consumers. Other MOM implementations broadcast or multicast messages instead of using point-to-point asynchronous communication via queues.

MOMs may be used in conjunction with a transaction processing system (TPS). TPSs are data processing systems in which processing is divided into distinct elements or units of work called transactions. After the processing of each transaction is complete, the results of the processing are saved using a commit command. A commit command ensures that changed data is either saved successfully or, if a fault occurs during the save, none of the changes within a transaction are applied until they can all be successfully applied. This ensures that data does not become lost or corrupted and can be returned or rolled back to a known state in the event of a fault.

In typical MOMs, message producers send messages to a message provider, which stores the messages on a message queue in the order they are received. In one group of such systems, referred to as point-to-point systems, the destination queue of each message may be specifically identified in the message. Alternatively, a publish/subscribe system may be used in which messages are identified by a topic and message consumers subscribe to a given topic by registering their interest with the message provider. In either system, the message provider sends the messages from the head of the queue to their appropriate message consumers, or the message consumer pulls messages from the message provider. In some systems, messages are streamed to message consumers. In other words, messages are sent from the queue without waiting for a specific request or acknowledgement for each message from the message consumer. In a transactional system, a problem can occur when one of a stream of messages to a message consumer crosses with a request, from that message consumer to the message provider, to commit a transaction. This can result in a message that has not been processed by the message consumer being removed from the message queue. Thus if, for example, a system crash occurs during the commit process, the message that crossed with the commit request may be lost, effectively corrupting the message queue.

SUMMARY OF THE INVENTION

An embodiment of the invention provides a method for managing a message queue in a transactional messaging system, the method comprising the steps of: receiving a first set of messages onto a message queue, the first set of messages being ordered earliest received first on the queue; sending a second set of one or more of the messages from the front of the queue to a message consumer; receiving a commit message from the message consumer, the commit message indicating a third set of messages to be committed; identifying any messages in the second set of messages that are not in the third set of messages; and replacing the identified messages ordered earliest received first in the queue ahead of the remainder of the first set of messages.

The second set of messages may be sent to the message consumer in response to a notification of the start of a transaction received from the message consumer. One of a first set of ordered priority levels may be assigned to each of the first set of messages, the messages being ordered on the queue firstly by highest priority level first and secondly earliest received first, and the priority level assigned to the identified messages is incremented when the messages are replaced on the queue. The highest priority level may be only assignable to identified messages being replaced on the queue. A second set of ordered priority levels may be provided having values intermediate to the values of the first set of ordered priority levels and which are assigned exclusively to the identified messages replaced on the queue.

The relative time of arrival of each message on the queue may be recorded against the respective message. The relative time of arrival may be updated for the message if the message is one of the identified messages replaced on the queue. The messages may be streamed from the queue to the consumer. The transactional message queue may form part of a message orientated middleware system. The transactional message queue may be provided by a Java™ messaging system provider.

Another embodiment provides an apparatus for managing a message queue in a transactional messaging system, the apparatus comprising: a message receiving interface for receiving a first set of messages;

a memory for storing a message queue onto which the first set of messages are placed, ordered earliest received first; a message dispatching interface arranged for sending a second set of one or more of the messages from the front of the queue to a message consumer; and a processor arranged, in response to a commit message from the consumer indicating a third set of messages to be committed, to identify any messages in the second set of messages and not in the third set of messages and to replace the identified messages ordered earliest received first in the queue ahead of the remainder of the first set of messages.

A further embodiment provides a program or a group of programs arranged to enable a programmable device or a group of such devices to perform a method for managing a message queue in a transactional messaging system, the method comprising the steps of: receiving a first set of messages onto a message queue, the first set of messages being ordered earliest received first on the queue; sending a second set of one or more of the messages from the front of the queue to a message consumer; receiving a commit message from the message consumer, the commit message indicating a third set of messages to be committed; identifying any messages in the second set of messages and not in the third set of messages; and replacing the identified messages ordered earliest received first in the queue ahead of the remainder of the first set of messages.

Another embodiment provides a program or a group of programs arranged to enable a programmable device or a group of such devices to provide apparatus for managing a message queue in a transactional messaging system, the apparatus comprising: a message receiving interface for receiving a first set of messages; a memory for storing a message queue onto which the first set of messages are placed, ordered earliest received first; a message dispatching interface arranged for sending a second set of one or more of the messages from the front of the queue to a message consumer; and a processor arranged, in response to a commit message from the consumer indicating a third set of messages to be committed, to identify any messages in the second set of messages and not in the third set of messages and to replace the identified messages ordered earliest received first in the queue ahead of the remainder of the first set of messages.

BRIEF DESCRIPTION OF THE DRAWINGS

Embodiments of the invention are described below in more detail, by way of example only, with reference to the accompanying drawings in which.

DESCRIPTION OF THE INVENTION

Figure 1:
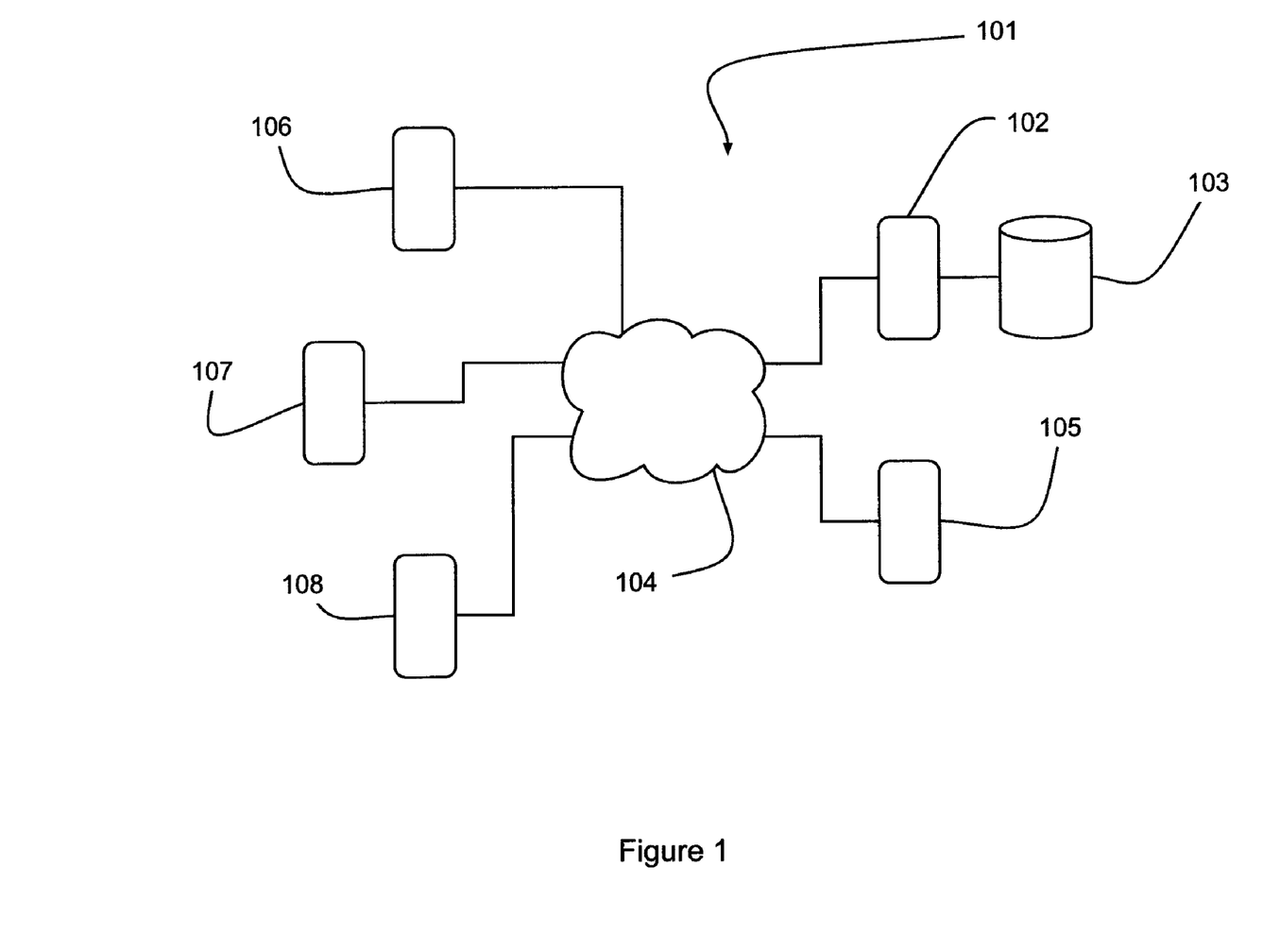
FIG. 1 is a schematic illustration of a computer system in which a plurality of client computers communicate via a transactional message orientated middleware (MOM) system.

With reference to FIG. 1, a computer system 101 comprises a first server computer 102 and an associated storage device 103 connected via a network 104 to a first client computer 105 and a second set of client computers 106, 107, 108. The server computer 102 runs a transactional message oriented middleware (MOM) system in the form of a Java™ Message Service (JMS) program that enables communication between JMS enabled application programs on the client computers 105, 106, 107, 108. The first client computer 105 is arranged as a JMS message producer, referred to herein as a message producer. The second set of client computers are arranged as JMS message consumers, referred to herein as message consumers. The JMS system, in the form of a JMS message provider, referred to herein as a message provider, on the server 102 provides a point-to-point messaging service for transmitting data from the JMS message producer on the first client computer 105 to each of the second set of client computers 106, 107, 108.

The message provider comprises a message receiving interface for receiving messages from the message producers or consumers 105, 106, 107, 108 and a message dispatching interface for sending messages to the message consumers 106, 107, 108. The message provider holds, in a memory, a separate message queue for each of the message consumers and further comprises a processor for managing each queue appropriately, as described in further detail below. In order to receive data from the message producer, each message consumer registers with the message provider. The message producer then sends data messages to the message provider, which then manages the forwarding of the data messages to the registered message consumers. As is typical with such point-to-point messaging systems, each data message sent from the message producer is only ever received by a single message consumer.

The MOM system running on the server computer 102 is transactional, so as to ensure that transmission of messages from the message producer to the message consumers is reliable. Furthermore, the message provider running on the server 102 is arranged to stream messages received from the message producers to its registered message consumers. The message provider comprises a number of queues, one for each registered message consumer. Each queue is used to store messages received from the message producer prior to them being streamed to the registered message consumer for a given queue. The messages on the queue are ordered by the sequence in which they arrive on the queue. In the present embodiment, a time stamp is assigned to each message in accordance with their receipt on the queue and used to order the messages so that the queue is arranged as a first-in-first-out (FIFO) queue. In other words, the time stamp for a given message is the time at which that message was placed on the queue.

The message flow between the message provider on the server computer 102 and one of the message consumers will now be described with reference to the message flow diagram of FIG. 2. At the start of a transaction, the message consumer sends a transaction notification message to the message provider, which identifies a transaction being initiated. Once the message provider receives the transaction notification message, it logs the transaction identification and returns an acknowledgement message indicating that the transaction is started. In the present embodiment, the message consumer then initiates a message listening process on the queue assigned for its specific point-to-point communications from the message producer. The message listener is a process, within the message provider, arranged to trigger when a message arrives on the queue in question. Once the message listener has been set up on the message provider, it returns an acknowledgement of the listener set-up to the message consumer.

As soon as a data message arrives, the message listener ensures that the message is sent to the message consumer as soon as it gets to the head of the message queue. In non-streaming messaging systems, a subsequent data message would not be sent to the message consumer until the previous message has been acknowledged by the message consumer so as to avoid overloading the message consumer. However, when messages are being streamed to the message consumer, such an acknowledgment mechanism may be omitted, and as each new data message is received on the queue, it is forwarded to the message consumer.

When a first message for the transaction arrives on the message queue of the message provider, it is identified by the message listener and pushed from the message queue to the message consumer. As a second and third messages arrive on the message queue, these are again identified by the message listener and streamed to the message consumer. When a message is removed from the message queue the message is temporarily stored in a message log until the transaction under which it was removed has been completed. The message log is maintained in addition to a traditional transaction log. The transaction log supports transactional semantics such as roll-back in the event of a failure. The message log enables the message provider to replace any messages on the queue that have been sent to the message consumer but not received in time to be processed in the current transaction. In the present embodiment, such messages are retrieved from the message log and replaced on the queue as described in further detail below.

Figure 2:
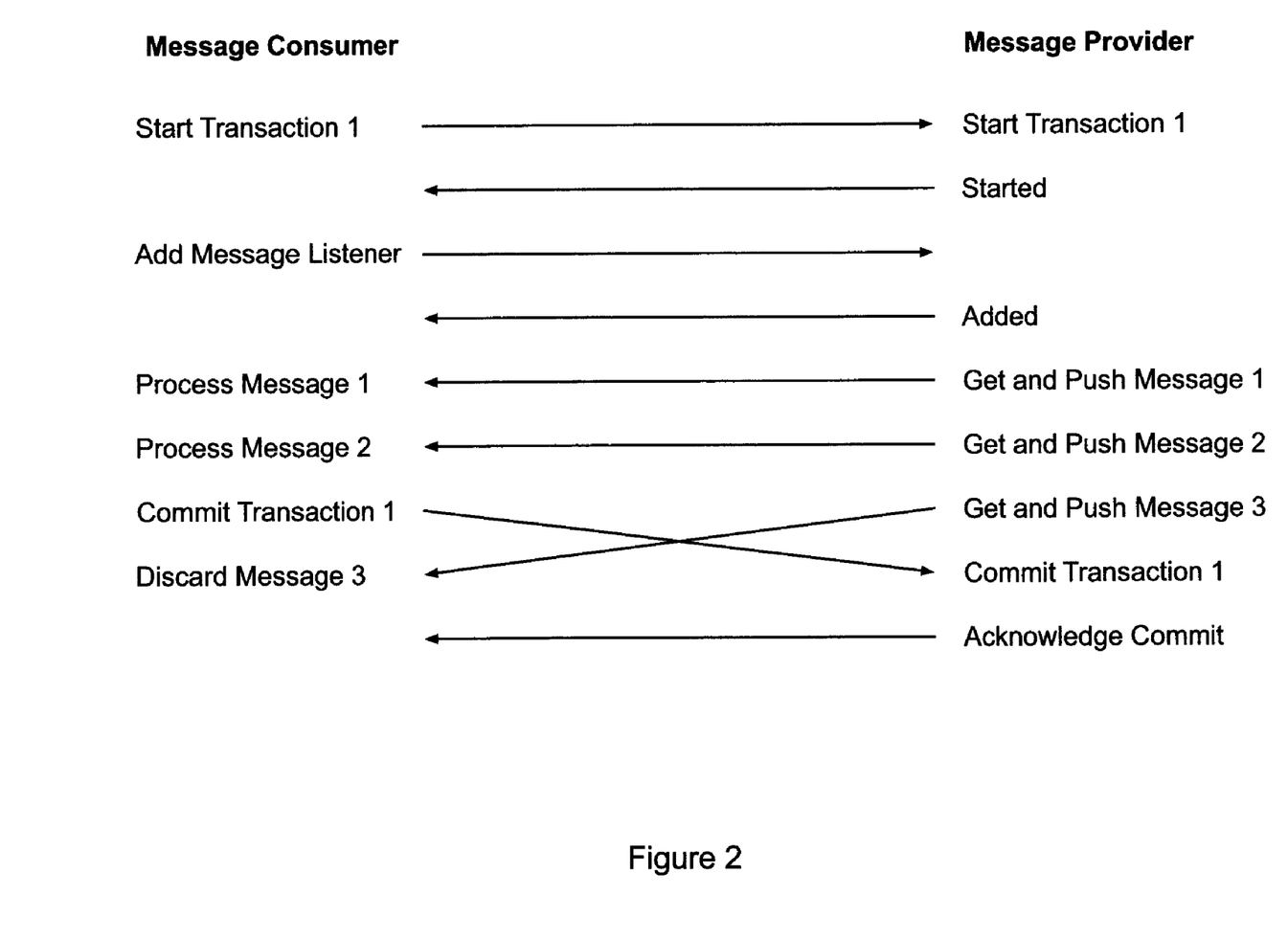
FIG. 2 is a message flow diagram illustrating the processing of messages from the message queues in the MOM system of FIG. 1.

In the example illustrated in FIG. 2, after the message consumer receives the second message, it begins the commit process for the transaction by sending a commit message to the message provider. In the present embodiment, the message consumer is arranged to initiate the commit process when it has received a predetermined number of messages from the message provider. In the example of FIG. 2, the commit message is sent prior to the receipt of the third message by the message consumer. Since the third message is received outside of any transaction, it is discarded by the message consumer. The commit message includes a list identifying the messages processed by the message consumer within the identified transaction. When the message provider receives the commit message, it compares the list of messages in the commit message against the message log for the queue. Any messages sent but not in the list of messages in the commit message are replaced on the message queue. The message provider can then commit the transaction and send an acknowledgement message for the commit to the message consumer and clear its message and transaction logs. As described in further detail below, messages are replaced in specific manner that preserves the relative ordering of messages on the queue immediately prior to the transaction while dispensing with a need to replace any given message at the same point in the queue from which it was removed.

Figure 3A:
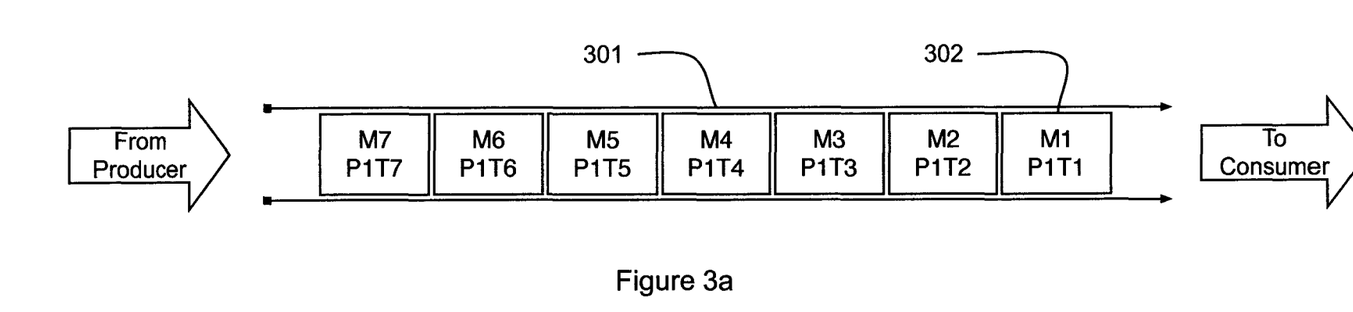
FIGS. 3a, 3b and 3c are a set of figures illustrating the content of a message queue in the computer system of FIG. 1.
Figure 3B:
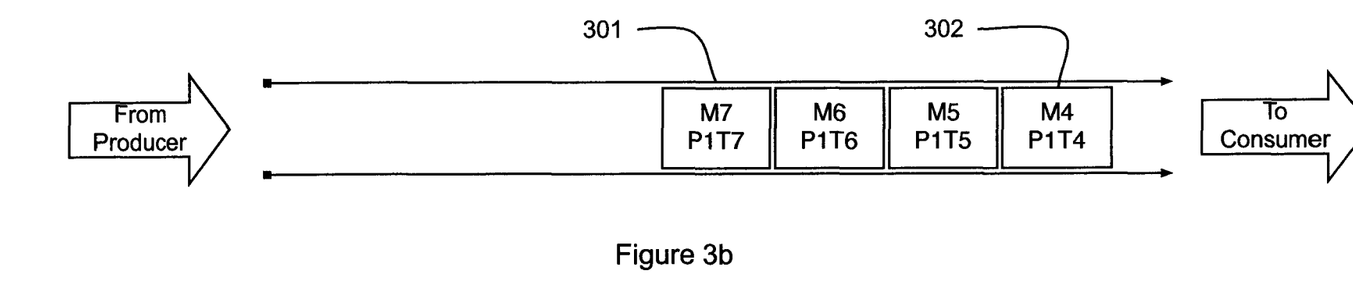

The processing of the message queue by the message provider during the message flow described above will now be described with reference to FIGS. 3a, 3b and 3c. FIG. 3a shows the queue 301 in its initial state, prior to the initiation of the transaction. The queue is loaded with messages 302, each message having a unique message identifier, such as M1, a time stamp, such as T1, and a message priority, P1. The time stamps are assigned to each message 302 in accordance with their arrival on the queue 301 from the message producer. Each new message arriving on the queue is also assigned a priority level of one, that is, P1. Once the first three messages for the transaction have been sent to the message consumer, the queue 301 is as shown in FIG. 3b. The first three messages have been removed from the queue and temporarily stored in the message log, pending the committing of the transaction.

Once the transaction commit request is received from the message consumer, as described above, the message provider compares the list of the received messages from the message consumer against its message log. All the messages that have been processed under the transaction are removed from the message log while any messages that have been sent but not acknowledged in the list are replaced on the queue. Messages are replaced on the queue in the time order of their original receipt but with a new time stamp that reflects the time they were replaced. Each replaced message also has their priority level incremented to a specific level reserved for messages that are being replaced on the queue as a result of being sent to a message consumer but not processed in the given transaction.

Figure 3C:
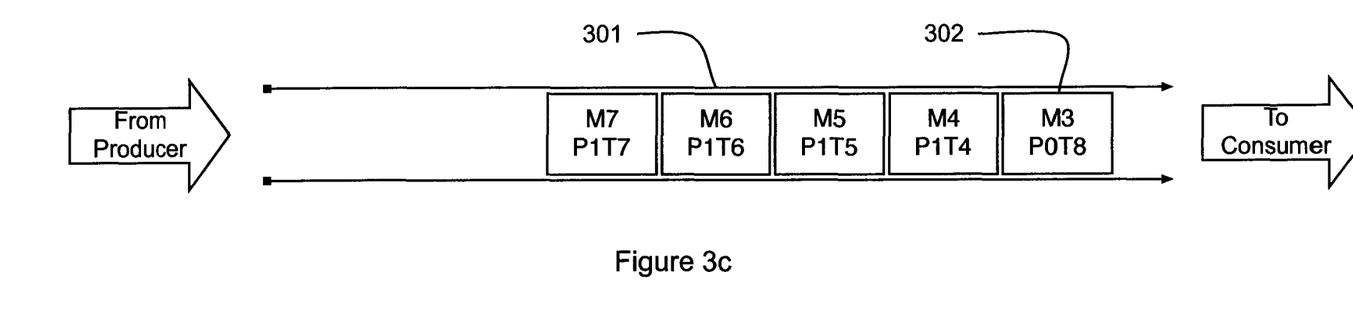

As shown in FIG. 3c, after the receipt of the commit request, the message provider has identified the third message (M3) as missing from the request and replaced the message on the queue 301. This is as a result of the commit request from the message consumer having crossed in the network 104 with the third message (M3). The message has a priority of zero (P0) and a new time stamp (T8). The queue 301 is arranged to be ordered firstly by priority and secondly by time stamp. Thus the replaced message (M3) is positioned at the head of the queue ahead of the, as yet, unsent messages (M4, M5, M6, M7). Once the sent but unprocessed message (M3) has been replaced, the transaction can be committed and the message log purged. Thus, the mechanism described above ensures that any sent messages that fail to reach their destinations before a commit request is issued from that destination will be returned to the queue with a priority level of zero, ensuring that they are replaced at the head of the queue. Replacing such messages ensures that the integrity of the message queue is maintained while enabling messages to be streamed in an appropriate order.

Figure 4:
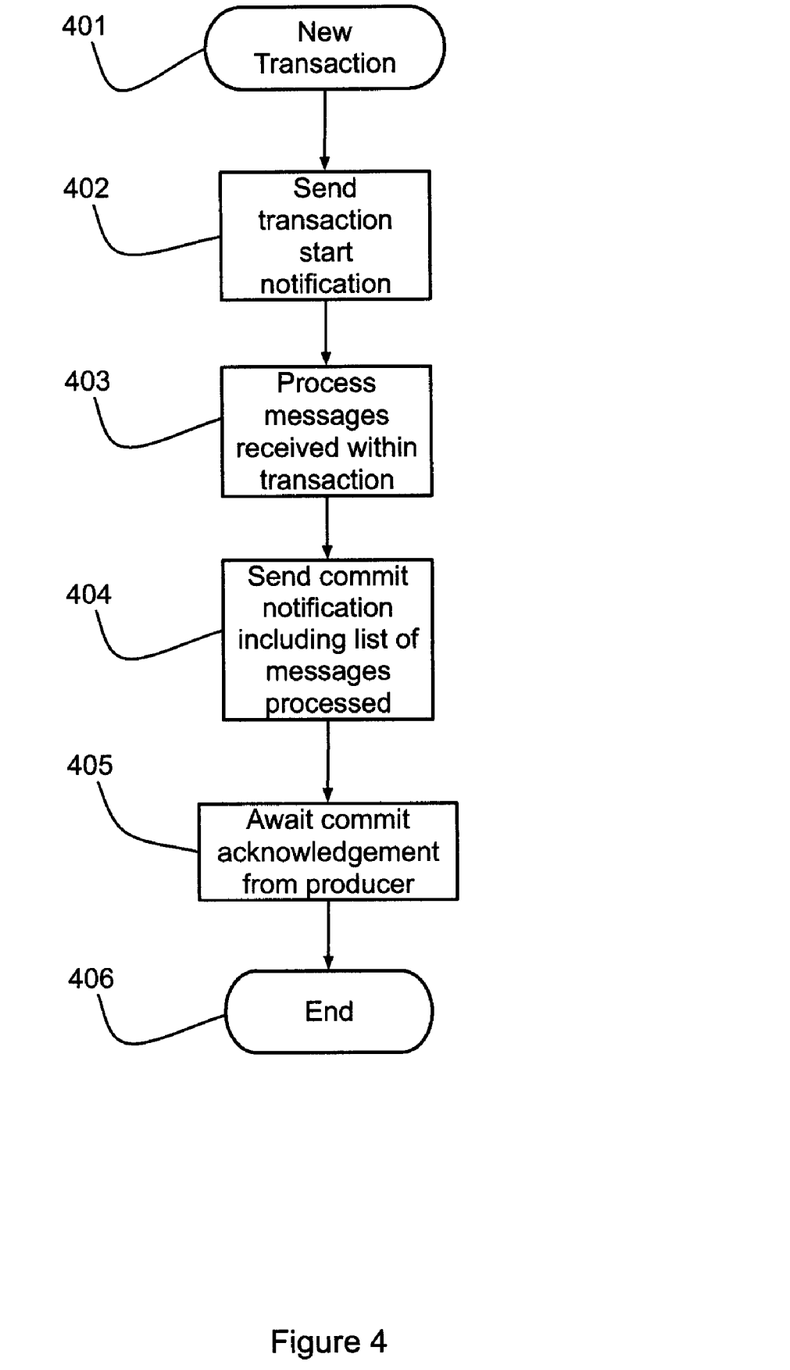
FIG. 4 is a flow chart illustrating processing carried out by a message consumer in the computer system of FIG. 1.

The transactional processing carried out by the message consumer when managing message receipt will now be described with reference to FIG. 4. At step 401, a new transaction is initiated and processing moves to step 402 where a transaction start notification, identifying the new transaction, is sent to the message provider. Once the transaction notification message has been acknowledged, processing moves to step 403 where each received message is processed in turn until the required messages for the transaction have been processed, at which point, processing moves to step 404. At step 404, a commit request is sent to the message provider, identifying the transaction to be committed and the messages processed under that transaction. Processing then moves to step 405 to await the receipt of the commit acknowledgement from the message provider and, once received, processing of the transaction ends at step 406.

Figure 5:
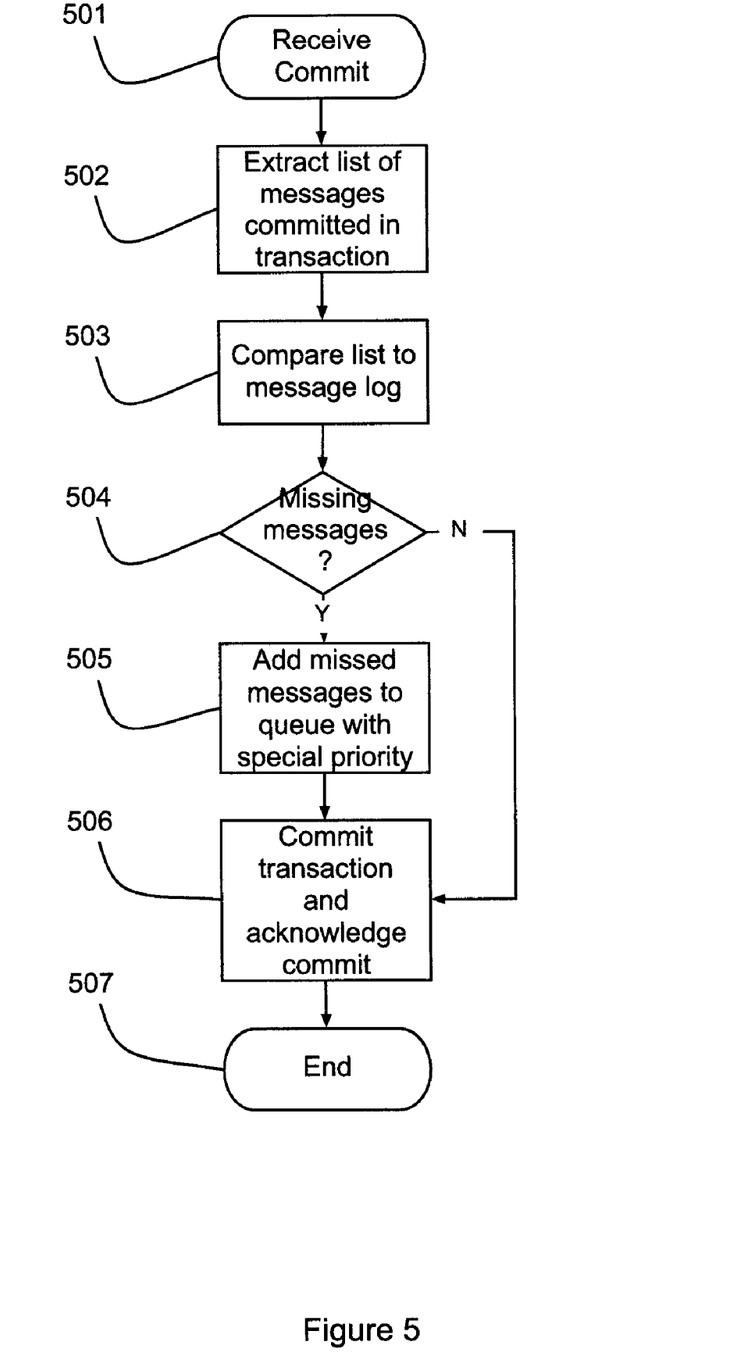
FIG. 5 is a flow chart illustrating processing carried out by a message provider in the computer system of FIG. 1.

The processing carried out by the message provider in response to a commit notification from a message consumer will now be described with reference to FIG. 5. As noted above, a commit notification from a message consumer is received when the message consumer has completed its processing for a given transaction. Under the same transaction, the message provider will have sent a number of messages from the message queue to the consumer, removed these messages from the message queue and logged the messages in the message log for the transaction. At step 501, a commit command is received from a message consumer and processing moves to step 502. At step 502, the list of messages processed under the transaction according to the message consumer is extracted from the commit notification message. Processing then moves to step 503 where the extracted list is compared to the message log for the given transaction. Processing then moves to step 504 where, if any messages in the provider's message log are missing from the consumer's list, then processing moves to step 505.

At step 505, the messages in the message log that are missing from the consumer's list are re-entered in original time stamp order on the message queue with their original message identifiers, updated time stamps and with their priority updated to priority level zero (P0). Since the message queue ordering is determined firstly by priority and then by arrival sequence, the replaced messages are placed at the head of the queue in time stamp order with any other P0 messages, and ahead of any lower priority messages. Processing then moves to step 506 where the transaction is committed and the message log is cleared. A commit acknowledgement message is also sent to the message consumer and processing ends at step 507. If at step 504, the provider's message log and the consumer's list contain only the same set of messages then processing jumps from step 504 to step 506 and proceeds as described above.

In another embodiment, message priorities are assigned by the producer of a given message. In this case, the provider has a special high priority message that cannot be set by producers.

In a further embodiment, further priority levels are provided which may be assigned to incoming messages and used to order the messages on the queue by priority group. Any messages received after a commit is initiated are replaced on the queue at a priority based on their existing priority minus 1. For example, assume messages M1, M2 and M3 are put on the queue at priority 3. All are sent to a consumer but only M1 and M2 are received prior to the commit message being issued. Before transaction is committed M4 arrives at priority 2 and is placed on the queue. M3 would be re-added to the queue with priority 2 and hence be positioned after M4. This maintains the sequencing of the queue. As the priority of the message has been increased, it means any new messages arriving at this priority will be queued after the replaced message. In effect this means a lower priority message has jumped ahead of higher priority messages. Continuing the example above, if a new message M5 arrives with priority 2 it will be placed after message M3 in the queue. Message M3 was originally priority 3 and should not jump ahead of higher priority messages such as M5. Given a starting point of a queue that does not allow messages to be replaced to original position this provides the best sequencing available.

In another embodiment, multiple intermediate priorities are provided that cannot be set by a producer but that can be set by the provider. For example, a replaced message M3 with original priority 3 is reset set to a priority of 2.9. This priority level would result in the message being placed ahead of messages from its original priority group but behind messages of priority 2.

In a further embodiment, a publish/subscribe messaging system is used in which the message provider maintains a queue for each subscriber. Each such queue for each subscriber is managed, as described above, with multiple priority levels so as to enable messages that were sent but not processed by the message receiver to be replaced on the queue ahead of unsent messages. These queues are arranged to as not to be directly visible to message consumers but provide suitable semantics for providing messages to their respective message consumers. Given that each message subscriber already has an internal queue, no further modification is required for the message consumers to operate in a publish/subscribe messaging system. Since there is only ever one subscriber for a given internal queue on the message provider, there is no risk of messages getting out of order when replaced on the queue, as the result of one or more messages crossing with a commit request from the message consumer.

An example of a suitable transactional message store is provided by an object database for Java™ called ObjectStore™ from the Progress™ Software Corporation, USA. As will be understood by those skilled in the art, MOMs other than JMS™ may be provided with the functionality of the embodiments described above.

It will be understood by those skilled in the art that the apparatus that embodies a part or all of the present invention may be a general purpose device having software arranged to provide a part or all of an embodiment of the invention. The device could be single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method for managing a message queue in a transactional messaging system, said method comprising:

receiving a first set of messages onto the message queue, said first set of messages being ordered earliest received first on said queue;

sending a second set of one or more of said messages from the front of said queue to a message consumer;

receiving a commit message from said message consumer, said commit message indicating a third set of messages to be committed;

identifying any messages in said second set of messages and not in said third set of messages; and replacing said identified messages ordered earliest received first onto said queue ahead of any messages in said first set of messages and not in said second set of messages.

2. The method according to claim 1, wherein said second set of messages are sent to said message consumer in response to a notification of the start of a transaction, said notification received from said message consumer.

3. The method according to claim 2, wherein one of a first set of ordered priority levels is assigned to each of said first set of messages, said messages being ordered on said queue firstly by highest priority level first and secondly earliest received first, and wherein said priority level assigned to said identified messages is incremented when said messages are replaced on said queue.

4. The method according to claim 3, wherein the highest priority level is only assignable to identified messages when said messages are replaced on said queue.

5. The method according to claim 3, wherein a second set of ordered priority levels having values intermediate to the values of said first set of ordered priority levels are assigned exclusively to said identified messages when said messages are replaced on said queue.

6. The method of claim 2, wherein the relative time of arrival of each said message on said queue is recorded against the respective message.

7. The method according to claim 6, wherein said relative time of arrival is updated for said message if said message is one of said identified messages replaced on said queue.

8. The method according claim 2, wherein said messages are streamed from said queue to said message consumer.

9. The method according to claim 2, wherein said message queue forms part of a message orientated middleware system.

10. The method according to claim 9, wherein said message queue is provided by a Java messaging system provider.

11. An apparatus for managing a message queue in a transactional messaging system, the apparatus comprising:

a message receiving interface for receiving a first set of messages;

a memory for storing a message queue onto which said first set of messages are placed, ordered earliest received first;

a message dispatching interface arranged for sending a second set of one or more of said messages from the front of said queue to a message consumer; and a processor arranged, in response to a commit message from said consumer indicating a third set of messages to be committed, to identify any messages in said second set of messages and not in said third set of messages and to replace said identified messages ordered earliest received first onto said queue ahead any messages in said first set of messages and not in said second set of messages.

12. The apparatus according to claim 11, wherein said message dispatching interface is further arranged for sending the second set of messages to said message consumer in response to a notification of the start of a transaction, said notification received from said message consumer.

13. The apparatus according to claim 12, wherein one of a first set of ordered priority levels is assigned to each of said first set of messages, said messages being ordered on said queue firstly by highest priority level first and secondly earliest received first, and wherein said priority level assigned to said identified messages is incremented when said messages are replaced on said queue.

14. The apparatus according to claim 13, wherein the highest priority level is only assignable to identified messages being replaced on said queue.

15. The apparatus according to claim 13, wherein a second set of ordered priority levels having values intermediate to the values of said first set of ordered priority levels are assignable exclusively to said identified messages replaced on said queue.

16. The apparatus according to claim 12, wherein said processor is further arranged to record against each said message the relative time of arrival of the respective message.

17. The apparatus according to claim 16, wherein said processor is further arranged to update the relative time of arrival for said message if said message is one of said identified messages replaced on said queue.

18. The apparatus according to claim 12, wherein said message dispatching interface is further arranged for streaming messages from said queue to said consumer.

19. The apparatus according to claim 12, wherein said message queue comprises a part of a message orientated middleware system.

20. The apparatus according to claim 19, wherein said message queue is provided by a Java messaging system provider.

21. A computer program product for managing a message queue in a transactional messaging system comprising a computer usable storage medium having computer usable program code embodied therewith, said computer usable program code comprising:

computer usable program code configured to receive a first set of messages onto the message queue, said first set of messages being ordered earliest received first on said queue;

computer usable program code configured to send a second set of one or more of said messages from the front of said queue to a message consumer;

computer usable program code configured to receive a commit message from said message consumer, said commit message indicating a third set of messages to be committed;

computer usable program code configured to identify any messages in said second set of messages and not in said third set of messages; and computer usable program code configured to replace said identified messages ordered earliest received first onto said queue ahead of any messages in said first set of messages and not in said second set of messages.

22. The computer program product according to claim 21, wherein said second set of messages are sent to said message consumer in response to a notification of the start of a transaction, said notification received from said message consumer.

23. The computer program product according to claim 22, wherein one of a first set of ordered priority levels is assigned to each of said first set of messages, said messages being ordered on said queue firstly by highest priority level first and secondly earliest received first, and wherein said priority level assigned to said identified messages is incremented when said messages are replaced on said queue.

24. The computer program product according to claim 23, wherein the highest priority level is only assignable to identified messages when said messages are replaced on said queue.

25. The computer program product according to claim 23, wherein a second set of ordered priority levels having values intermediate to the values of said first set of ordered priority levels are assigned exclusively to said identified messages when said messages are replaced on said queue.

* * * * *